United States Patent
Mustafic et al.

(10) Patent No.: US 10,548,185 B2
(45) Date of Patent: Jan. 28, 2020

(54) FACILITATING INTEGRATED MANAGEMENT OF CONNECTED ASSETS THAT UTILIZE DIFFERENT TECHNOLOGIES AND THAT ARE LOCATED ACROSS DISPARATE WIRELESS COMMUNICATIONS NETWORKS

(71) Applicant: AT&T Mobility II LLC, Atlanta, GA (US)

(72) Inventors: Damir Mustafic, Atlanta, GA (US); Leonard Burnett, Marietta, GA (US); Pingying Xia, Alpharetta, GA (US); Steven Manenti, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 50 days.

(21) Appl. No.: 15/631,893

(22) Filed: Jun. 23, 2017

(65) Prior Publication Data

US 2018/0376534 A1 Dec. 27, 2018

(51) Int. Cl.
| | | |
|---|---|---|
| *H04W 92/02* | (2009.01) | |
| *H04L 9/32* | (2006.01) | |
| *H04W 8/18* | (2009.01) | |
| *H04L 9/06* | (2006.01) | |

(52) U.S. Cl.
CPC .......... *H04W 92/02* (2013.01); *H04L 9/0631* (2013.01); *H04L 9/32* (2013.01); *H04W 8/183* (2013.01)

(58) Field of Classification Search
CPC .......... H04W 92/02; H04W 8/183; H04L 9/32
See application file for complete search history.

(56) References Cited

U.S. PATENT DOCUMENTS

| | | |
|---|---|---|
| 6,215,486 B1 | 4/2001 | Walls et al. |
| 6,434,450 B1 | 8/2002 | Griffin, Jr. et al. |
| 6,919,792 B1 | 7/2005 | Battini et al. |

(Continued)

OTHER PUBLICATIONS

"Comprehensive coverage, rapid resolution, monitoring automation," OpsView, IT Monitoring for Networks, Applications, Virtual Servers and the Cloud, https://www.opsview.com/, Retrieved on Jun. 19, 2017, 4 pages.

(Continued)

*Primary Examiner* — Ajit Patel
*Assistant Examiner* — Wilfred Thomas
(74) *Attorney, Agent, or Firm* — Amin, Turocy & Watson, LLP

(57) ABSTRACT

Integrated management of connected assets that utilize different technologies and that are located across disparate wireless communications networks is facilitated herein. A method can comprise evaluating, by a system comprising a processor, first data associated with a first device operable with a first computing platform and second data associated with a second device operable with a second computing platform different from the first computing platform. The method can also comprise transforming, by the system, at least a first portion of the first data and at least a second portion of the second data into third data. The third data can be compatible with the first data and the second data. Further, the method can comprise rendering, by the system, the third data as an integrated view of at least the first portion of the first data and at least the second portion of the second data.

20 Claims, 13 Drawing Sheets

(56) References Cited

U.S. PATENT DOCUMENTS

| | | |
|---|---|---|
| 7,269,625 B1 | 9/2007 | Willhide et al. |
| 7,496,846 B2 | 2/2009 | Malmstrom |
| 7,814,516 B2 | 10/2010 | Stecyk et al. |
| 8,073,564 B2 | 12/2011 | Bruemmer et al. |
| 8,135,889 B2 | 3/2012 | Crucs |
| 8,696,565 B2 | 4/2014 | Alberte, Jr. et al. |
| 8,806,486 B2 | 8/2014 | Martin et al. |
| 8,842,384 B2 | 9/2014 | Jhatakia et al. |
| 8,959,514 B2 | 2/2015 | Luxenberg et al. |
| 9,235,442 B2 | 1/2016 | Kampas et al. |
| 9,467,565 B2 | 10/2016 | Khalil et al. |
| 9,621,428 B1 | 4/2017 | Lev et al. |
| 9,990,389 B1 * | 6/2018 | Zenger .............. G06F 17/30365 |
| 2003/0177250 A1 * | 9/2003 | Oliver ................... G06F 21/10 709/229 |
| 2007/0198457 A1 * | 8/2007 | Olenick ........... G06F 17/30569 |
| 2009/0029736 A1 * | 1/2009 | Kim ................. H04M 1/72522 455/558 |
| 2010/0332640 A1 | 12/2010 | Goodrow et al. |
| 2011/0022733 A1 * | 1/2011 | Karaoguz ............ H04L 67/303 709/247 |
| 2011/0289588 A1 | 11/2011 | Sahai et al. |
| 2012/0240048 A1 | 9/2012 | Fortier et al. |
| 2013/0191139 A1 * | 7/2013 | Chen .................. G06F 19/3456 705/2 |
| 2015/0236918 A1 | 8/2015 | Cs et al. |
| 2015/0341230 A1 | 11/2015 | Dave et al. |
| 2015/0353204 A1 | 12/2015 | Manochio et al. |
| 2016/0037329 A1 * | 2/2016 | Chong ................. H04W 76/10 455/422.1 |
| 2016/0203319 A1 | 7/2016 | Coen et al. |
| 2016/0357611 A1 | 12/2016 | Sapuram et al. |
| 2017/0031773 A1 | 2/2017 | Prahlad et al. |

OTHER PUBLICATIONS

"Run Your IT Business from One Platform," Continuum: IT Management, BDR and RMM Software Built for MSPs, https://www.continuum.net/, Retrieved on Jun. 19, 2017, 4 pages.

"Visualize. Manage. Understand." OmniCenter: IT Network Monitoring & Reporting Appliance, http://www.netreo.com/omnicenter/, Retrieved on Sep. 22, 2017, 3 pages.

"Single Pane of Glass Solution," OSI Soft, https://partners.osisoft.com/solutions/solution/162/single-pane-of-glass-solution, Retrieved on Jun. 19, 2017, 3 pages.

Oliver, "RightScale's Single Pane of Glass for Multi-cloud Management," The New Stack, May 16, 2016, 5 pages. https://thenewstack.io/single-pane-glass-multi-cloud-management-rightscale/.

"SmartView Dashboard," Cyint, cyient.com, http://www.cyient.com/services/networks-operations/it-service-management/smartview-dashboard/. Retrieved on Sep. 22, 2017, 4 pages.

\* cited by examiner

FACILITATING INTEGRATED MANAGEMENT OF CONNECTED ASSETS THAT UTILIZE DIFFERENT TECHNOLOGIES AND THAT ARE LOCATED ACROSS DISPARATE WIRELESS COMMUNICATIONS NETWORKS

TECHNICAL FIELD

The subject disclosure relates generally to communications systems, and for example, to facilitating integrated management of connected assets that utilize different technologies and that are located across disparate wireless communications networks.

BACKGROUND

The advancement of computing technologies has evolved into an inter-networking of an "Internet of Things" (IoTs) with the capability to collect and exchange data. Devices that can be utilized as IoT devices include physical devices, vehicles, objects, and other items embedded with communication capabilities. Through the utilization of the IoT devices, global entities can have connected computing assets across multiple regions (both nationally and internationally), which can utilize different local operator's networks. Therefore, the operation and management of the IoT devices present unique channels since the technology for operating the connected computing assets can utilize different control platforms.

BRIEF DESCRIPTION OF THE DRAWINGS

Various non-limiting embodiments are further described with reference to the accompanying drawings in which.

DETAILED DESCRIPTION

Figure 1:
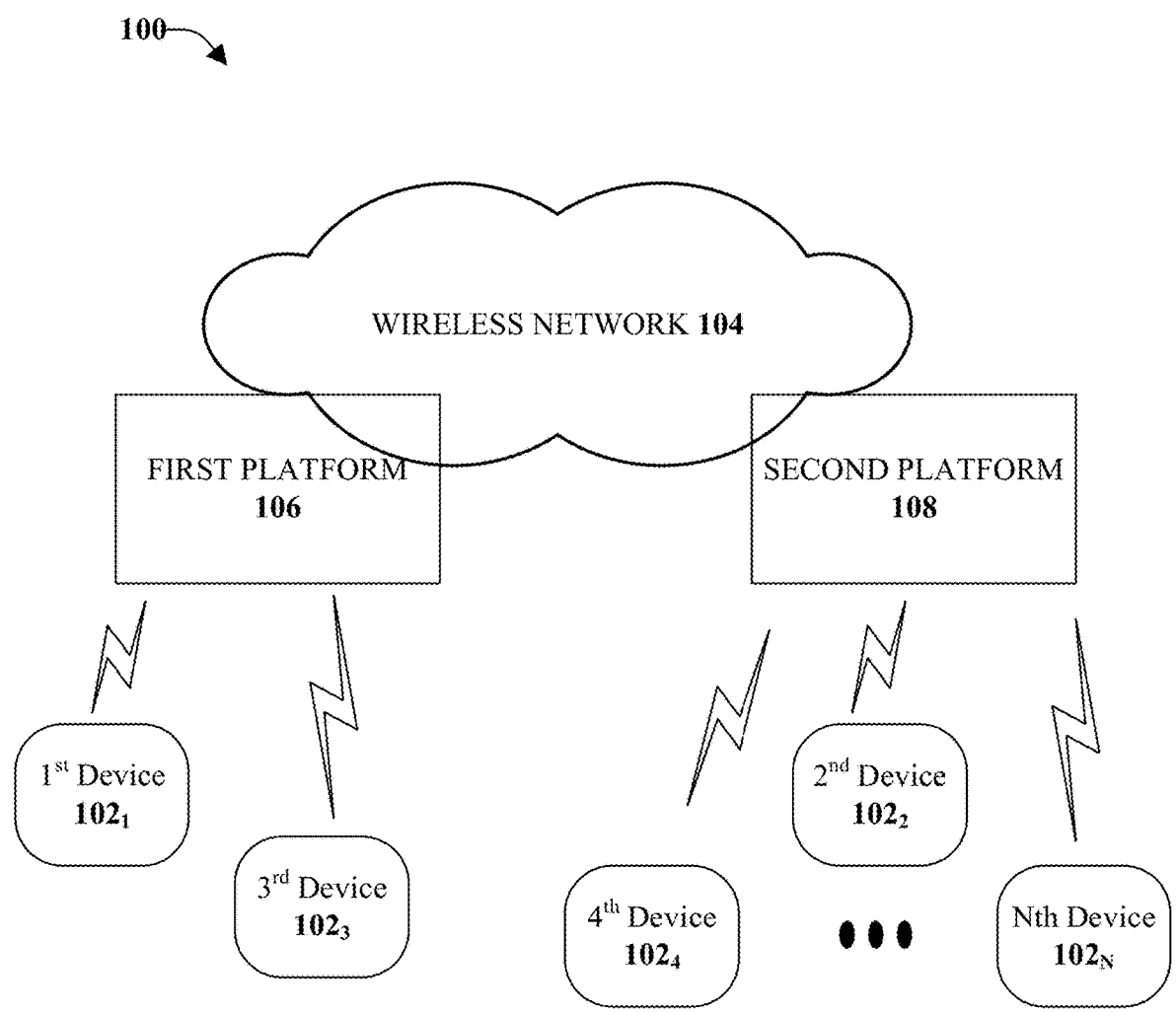
FIG. 1 illustrates an example, non-limiting, network communications environment in accordance with one or more embodiments of the disclosed aspects.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate an aggregated view of one or more devices (e.g., Internet of Things (IoT) devices) that can be configured for one or more different platforms and/or one or more different providers and/or networks. According to some implementations, two or more devices can share a same functionality, a similar functionality, and/or a divergent functionality. Respective information for the one or more devices can be rendered in a manner that provides a common experience across the different platforms.

The one or more devices can be associated with a single entity and/or one or more common entities of an enterprise customer (e.g., a global business). According to a non-limiting example, an entity can be associated with devices in a same geographic area, or different geographic areas. The different geographic areas can include different countries. For example, a global business entity can be a vehicle manufacturer that conducts business in the United States, Europe, and other countries. The devices in the United States can be supported by a first system, the devices in Europe can be supported by a second system, and devices in subsequent countries can be supported by subsequent systems.

The various aspects discussed herein can aggregate a view of information for subscriptions that exist in the United States and those that exist in Europe (or another country) to provide a common view for the enterprise customer. In such a manner, the fact that there are multiple platforms in operation behind the scenes is abstracted and the subscription can be rendered in a manner that is representative of the business. According to some implementations, administration of the subscription, device management, and/or Subscriber Identification Module (SIM) management can be provided as the common view. Thus, the information can be rendered in a meaningful way without the need to learn multiple platforms.

Accordingly, the disclosed aspects provide a management system that can integrate multiple technologies, multiple carrier's networks, and multiple regions. Thus, based on the common view, customers can improve their operational efficiencies. Further, the disclosed aspects can provide an integrated view of all the connected assets and a central place to manage those assets (e.g., IoT devices).

Further, the integrated view can be managed on one of the networks or on different networks, which can be selected as a function of the entity that requested the data. The integrated view can eliminate redundant steps in a management system. For example, a status of an IoT device might be unknown to an entity requesting data about the IoT device. Thus, the entity might first attempt to view data in a local control center and might determine that the IoT device is not listed in the local control center data (e.g., first step). Thus, the entity accesses a subscription management profile system and determines the IoT device is in a different country and operating in the local control center of the different country (e.g., a second step). Therefore, the entity accesses the local control center of the different country and, depending on the experience with that local control center, can access the information (e.g., a third step). The disclosed aspects can eliminate two steps of the above three mentioned steps by providing all data assets (e.g., IoT assets) managed by the entity in a single format. Further, the entity does not have to piece together the information, which is performed automatically by the system.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in Third Generation Partnership Project (3GPP) systems, Fourth Generation (4G) standard for wireless communications, and/or Long Term Evolution (LTE) systems. For example, aspects or features of the disclosed embodiments can be exploited in substantially any wireless communication technology. Such wireless communication technologies can include, but are not limited to, Satellite, Low Power Wide Area (LPWA), UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. As used herein, "5G" can also be referred to as New Radio (NR) access.

In one embodiment, described herein is a method that can comprise evaluating, by a system comprising a processor, first data associated with a first device operable with a first computing platform and second data associated with a second device operable with a second computing platform different from the first computing platform. The method can also comprise transforming, by the system, at least a first portion of the first data and at least a second portion of the second data into third data. The third data can be compatible with the first data and the second data. Further, the method can comprise rendering, by the system, the third data as an integrated view of at least the first portion of the first data and at least the second portion of the second data. The third data can be rendered on a third device remote from the first device and the second device.

According to an example, the third data can be a normalized version of the first data and the second data. In another example, the third data can be operable in accordance with the first computing platform. In still another example, the third data can be operable in accordance with the second computing platform. In yet another example, the third data can be operable in accordance with another computing platform.

In an example, transforming at least the first portion of the first data and at least the second portion of the second data can comprise determining the first computing platform is managed by a first mobile network operator of a first geographic region that applies first localized standards to manage the first device. Further to this example, the method can comprise determining the second computing platform is managed by a second mobile network operator of a second geographic region that applies second localized standards to manage the second device.

In another example, transforming at least the first portion of the first data and at least the second portion of the second data can comprise determining the first device comprises a subscriber identification module that was re-credentialed for use with the first computing platform. The third data can comprise historical data for the subscriber identification module.

According to another example, transforming at least the first portion of the first data can comprise parsing at least the first portion of the first data based on a first native format of the first data. Further, transforming at least the second portion of the second data can comprise parsing at least the second portion of the second data based on a second native format of the second data. Further to this example, the method can comprise determining the first native format based on a first identification of a first network service provider device operatively coupled to the first device and determining the second native format based on a second identification of a second network service provider device operatively coupled to the second device. The first network service provider device and the second network service provider device can be located in disparate geographic regions.

According to an example, the first computing platform can utilize satellite technology, and the second computing platform can utilize Wi-Fi technology. In another example, the first computing platform can utilize Wi-Fi technology and the second computing platform can utilize satellite technology. Additionally or alternatively, one or more of the first computing platform and the second computing platform can utilize cellular technology.

In yet another example, the method can comprise determining, by the system, that the first device and the second device comprise a similar functionality according to a similarity criterion. According to still another example, the method can comprise determining, by the system, that the first device and the second device comprise different functionalities according to a dissimilarity criterion.

Another embodiment is a system that can comprise a processor and a memory. The memory can store executable instructions that, when executed by the processor, facilitate performance of operations. The operations can comprise evaluating first data of a first device and second data of a second device. The first device can be determined to utilize a first computing platform managed by a first mobile network device. The second device can be determined to utilize a second computing platform managed by a second mobile network device. The operations can also comprise converting the first data and the second data into third data. The third data can represent the first data and the second data according to a common format configured to operate on a third computing platform. The first device and the second device can be classified as internet of things devices.

In an example, the operations can also comprise rendering the third data in a configurable format. Further, the operations can comprise facilitating a first alteration of a first configuration of the first device based on a first change to the third data. In addition, the operations can comprise facilitating a second alteration of a second configuration of the second device based on a second change to the third data.

The first data can comprise first subscriber identification module historical information for the first device. In addition, the second data can comprise second subscriber identification module historical information for the second device.

In another example, the operations can comprise normalizing the first data based on a first native format of the first device and normalizing the second data based on a second native format of the second device. Further to this example, the first native format can be associated with a first service provider device and the second native format can be associated with a second service provider device. Further, the first service provider device and the second service provider device can be located in different geographic areas.

According to yet another embodiment, described herein is a machine-readable storage medium comprising executable instructions that, when executed by a processor, facilitate performance of operations. The operations can comprise evaluating first data associated with a first device controlled by a first mobile network device of a first communications network and evaluating second data associated with a second device controlled by a second mobile network device of a second communications network. The first communications network and the second communications network can be different communications networks. The operations can also comprise transforming a first portion of the first data and a second portion of the second data into third data. Further, the operations can comprise rendering the third data as a normalized view of at least the first portion of the first data and at least the second portion of the second data. The third data can be rendered on a third device configured to facilitate management of the first device by the first mobile network device and the second device by the second mobile network device. In an example, the first data can comprise first subscriber identification module historical provision information for the first device. Further, the second data can comprise second subscriber identification module historical provision information for the second device.

FIG. 1 illustrates an example, non-limiting, network communications environment 100 in accordance with one or more embodiments of the disclosed aspects. Various entities, especially international enterprise entities, can interact with different Mobile Network Operators (MNOs) for their Internet of Things (IoT) devices in different countries or regions. Some customers use different technologies, such as cellular, Satellite, Wi-Fi, and so on, to achieve ubiquitous coverage. To improve processing efficiency, the disclosed aspects dynamically provide management of connected assets from a single platform.

As illustrated, one or more user equipment (UE) or devices $102_1$, $102_2$, $102_3$, $102_4$, through $102_N$, where N is an integer, can be operatively associated with a single entity. For example, the single entity can be a business that operates in multiple geographic areas. It is noted that the devices, although managed by a single entity, can be associated with different users. For example, the single entity can be a vehicle manufacturer and respective devices managed by the single entity are operatively coupled to vehicles. Thus, the vehicles can be under the control of (or owned by) different users, however, the respective devices are managed by the single entity.

Accordingly, the IoT devices $102_1$, $102_2$, $102_3$, $102_4$, through $102_N$, can be operatively coupled to a wireless network 104. According to an implementation, the wireless network 104 can be a cloud-computing environment. It is to be understood that although various aspects are discussed with respect to a cloud-computing environment, the disclosed aspects are not limited to this implementation. Instead, one or more embodiments are capable of being implemented in conjunction with any other type of computing environment now known or later developed.

In some implementations, a first subset of the devices (e.g., devices $102_1$ and $102_3$) can be operatively coupled to the wireless network 104 through a first platform 106. A second subset of the devices (e.g., devices $102_2$, $102_4$, through $102_N$) can be operatively coupled to the wireless network 104 through a second platform 108. It is noted that although only two platforms are illustrated and described for purposes of simplicity, any number of platforms can be utilized with the disclosed aspects. Further, although a particular quantity of devices are illustrated and described as being coupled to the platforms, any number of devices can be operatively coupled to the platforms (e.g., more than two devices can be operatively coupled to the first platform 106 and/or fewer or more than three devices can be operatively coupled to the second platform 108).

The one or more devices $102_1$, $102_2$, $102_3$, $102_4$, through $102_N$ can represent the same or different types of communications devices. In some implementations, the one or more devices $102_1$, $102_2$, $102_3$, $102_4$, through $102_N$ can have a same functionality, a similar functionality, or different functionality.

The platforms can be included, at least partially, in the wireless network 104. Further, the platforms can represent different mobile network operators, according to an aspect. As it relates, for example, to national and/or international enterprise entities, related entities (e.g., subsidiaries of a parent entity) that are located in different regions and/or different countries can interface with different MNOs for operation and management of the respective IoT devices in the diverse geographic regions. The devices within respective geographic regions can be operated according to respective localized standards.

Figure 2:
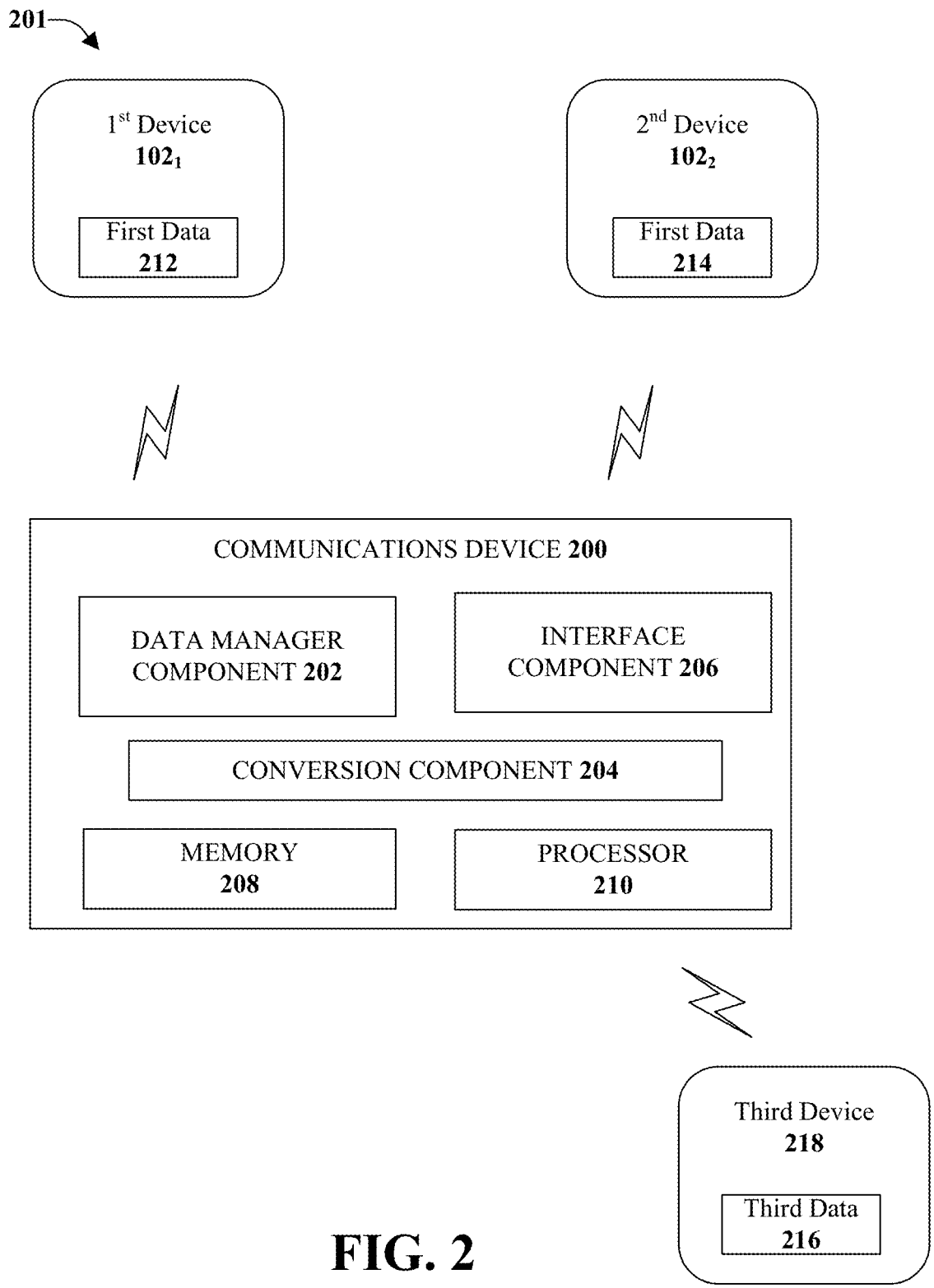
FIG. 2 illustrates an example, non-limiting, communications device for facilitating an integrated view of related devices in a common management format in a wireless communications system in accordance with one or more embodiments described herein.

FIG. 2 illustrates an example, non-limiting, communications device 200 for facilitating an integrated view of related devices in a common management format in a wireless communications system 201 in accordance with one or more embodiments described herein. Repetitive description of like elements employed in other embodiments described herein is omitted for sake of brevity. The communications device 200 can comprise a data manager component 202, a conversion component 204, an interface component 206, at least one memory 208, and at least one processor 210. The data manager component 202 can evaluate first data 212 associated with the first device $102_1$ and second data 214 associated with the second device $102_2$. The first device $102_1$ can be operable with a first computing platform (e.g., the first platform 106 of FIG. 1) and the second device $102_2$ can be operable with a second computing platform (e.g., the second platform 108 of FIG. 1). The first computing platform and the second computing platform can be different computing platforms. According to an implementation, the first computing platform and/or the second computing platform can utilize satellite technology, Wi-Fi technology, cellular technology, or another communications technology.

Further, the data manager component 202 can evaluate subsequent data from subsequent devices that can be operable with the first computing platform, the second computing platform, or other computing platforms. For example, the data manager component 202 can evaluate native formats of the data. The native formats can be obtained for each platform or MNO according to some implementations. For example, partnerships can be established across platforms/MNOs to enable sharing of data in accordance with the disclosed aspects.

The conversion component 204 can transform at least a portion of the first data 212 and at least a second portion of the second data 214 into third data 216. For example, only a portion of the data may be relevant for use by a managing entity as discussed herein. The other data, excluding the portion of the data might not be of interest and, therefore, is not transformed into third data. The third data 216 can be compatible with the first data 212 and the second data 214. For example, configuration of the third data 216 can facilitate an associated configuration of the first data 212 and/or the second data 214. In addition, the third data 216 can be a normalized version of the first data 212 and the second data 214.

To transform the data, the conversion component 204 can determine the first computing platform is managed by a first mobile network operator of a first geographic region that applies first localized standards to manage the first device $102_1$. Further, the conversion component 204 can determine the second computing platform is managed by a second mobile network operator of a second geographic region that applies second localized standards to manage the second device $102_2$.

According to some implementations, the conversion component 204 can parse or divide at least the first portion of the first data 212 based on the first native format of the first data. Further, the conversion component 204 can parse at least the second portion of the second data based on the second native format of the second data 214. Further to this implementation, the conversion component 204 can determine the first native format based on a first identification of a first network service provider device operatively coupled to the first device $102_1$. In addition, the conversion component 204 can determine the second native format based on a second identification of a second network service provider device operatively coupled to the second device $102_2$. The first network service provider device and the second network service provider device can be located in disparate geographic regions. For example, the first network service provider device (and the first device $102_1$) can be located in a first country and the second network service provider device (and the second device $102_2$) can be located in a second country.

Further, the interface component 206 can render the third data 216 as an integrated view of at least the first portion of the first data 212 and at least the second portion of the second data. The third data 216 can be rendered on a third device 218, which can be remote from the first device $102_1$ and the second device $102_2$. However, according to some implementations, the third device 218 can be located in a similar geographic area as first device $102_1$ and/or the second device $102_2$ (or a subsequent device).

In an example, a first platform uses A, B, and C, and a second platform uses D, E, and F. Accordingly, the communications device 200 can combine A, B, C, D, E, and F and convert it into S, Y, and X (for example). This can be facilitated even though the platforms communicate in different languages, use different parameters, or have different ways to organize the data. The communications device 200 can processes the data and convert the data into one unified view so that the customer can monitor their devices managed by the underlying systems from one single place in an integrated way.

The at least one memory 208 can be operatively coupled to the at least one processor 210. The at least one memory 208 can store protocols associated with facilitating integrated management of connected assets that utilize different technologies and that are located across disparate wireless communications networks as discussed herein. Further, the at least one memory 208 can facilitate action to control communication between the communications device 200, the first device $102_1$, the second device $102_2$, the third device 218, other devices, and so on, such that the communications device 200 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 210 can facilitate dynamically converting information from one or more connected assets (or devices) in a communication network to output the data as an integrated view as discussed herein. The at least one processor 210 can be a processor dedicated to analyzing and/or generating information received, a processor that controls one or more components of the communications system (e.g., the network communications environment 100 of FIG. 1), and/or a processor that both analyzes and generates information received and controls one or more components of the communications system.

Figure 3:
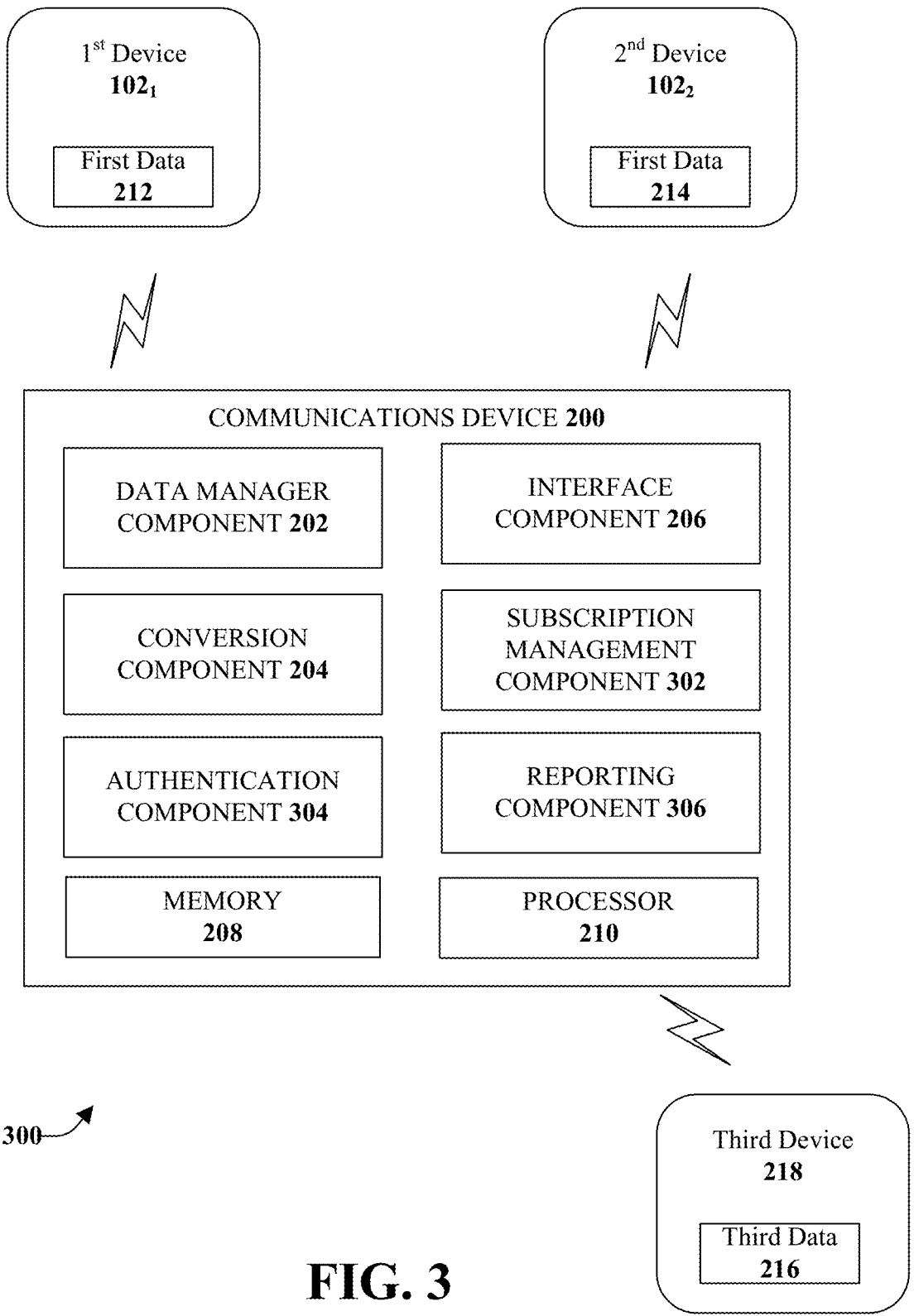
FIG. 3 illustrates an example, non-limiting, communications system for facilitating integrated management of connected assets that utilize different technologies and that are located across disparate wireless communications networks in accordance with one or more embodiments described herein.

FIG. 3 illustrates an example, non-limiting, communications system 300 for facilitating integrated management of connected assets that utilize different technologies and that are located across disparate wireless communications networks in accordance with one or more embodiments described herein. Repetitive description of like elements employed in other embodiments described herein is omitted for sake of brevity. The system 300 can comprise one or more of the components and/or functionality of communications system 201 and vice versa.

As illustrated, the communications device can comprise a subscription management component 302, an authentication component 304, and a reporting component 306. The subscription management component 302 can evaluate respective SIMs associated with the first device $102_1$, the second device $102_2$, and/or subsequent devices. According to some implementations, different computing platforms utilize different manners of monitoring SIMs. Accordingly, the communications device 200 can provide a unified SIM status, which comprises a conversion between the communications system 300 and the underlying platform.

In an example, a profile for an embedded SIM can be changed, such as in the case of a device embedded with a vehicle. The SIM should be configured to operate on the wireless operator's network and, thus, the SIM is programmed for the particular mobile network operator. The SIM can be re-credentialed such that the SIM has a different profile than its original profile. Thus, the subscription management component 302 can selectively monitor and track the history of the SIM and provide the information in a format that is simple to understand and visualize. Accordingly, the original SIM information is available and can be traced end-to-end to know what occurred even though the underlying systems can be different. Further, through the subscription management component 302 (or the interface component 206), the SIM can be re-credentialed during different stages of the life cycle of the device.

Accordingly, the subscription management component 302 can determine the first device comprises a subscriber identification module that was re-credentialed for use with the first computing platform, and wherein the third data comprises historical data for the first subscriber identification module. Additionally or alternatively, the subscription management component 302 can determine the second device comprises a subscriber identification module that was re-credentialed for use with the second computing platform, and wherein the third data comprises historical data for the second subscriber identification module. SIM information for other device can also be monitored and tracked as discussed herein.

The authentication component 304 can selectively allow or deny access to the third data 216. For example, the third data 216 can be accessible through a web portal tailored for a particular entity. The web portal can allow the entity (e.g., authorized personnel) to access the third data 216. For example, the authorized personnel can access the data though their respective mobile devices. Accordingly, credentials can be associated with one or more of the authorized personnel in order to access the third data 216.

In some implementations, the authentication component 304 can include a first authentication process for viewing data, and a second authentication process for modification to the data and/or management of a connected asset. However, in some implementations, a single authentication process is utilized and various data and/or functions can be masked or revealed depending on the user associated with the credential.

Figure 4:
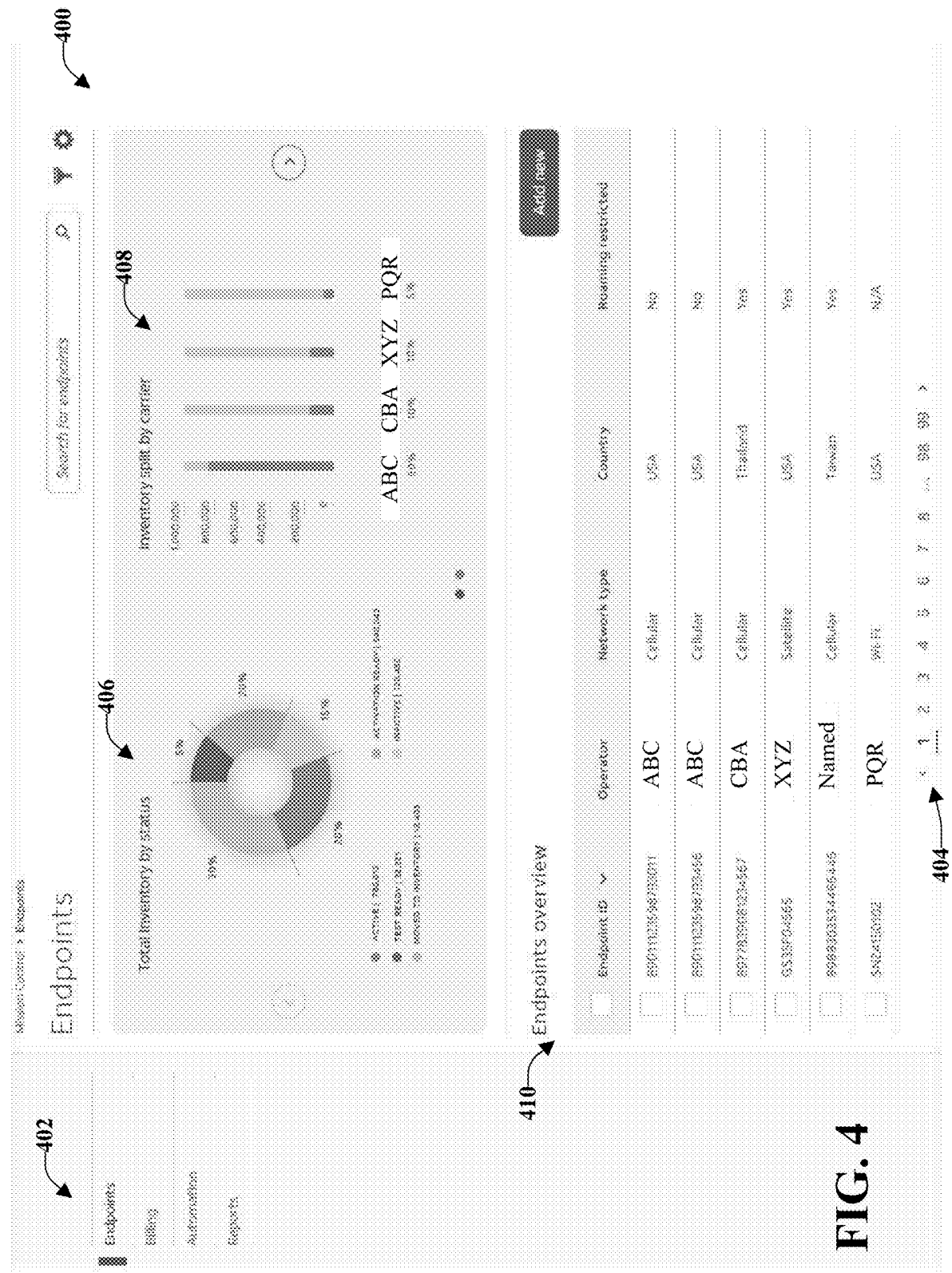
FIG. 4 illustrates an example, non-limiting, representation of a web page that can be rendered in accordance with one or more embodiments described herein.

The reporting component 306 can provide one or more reports associated with the connected assets. A rendering of the report can be facilitated through the interface component 206. FIG. 4 illustrates an example, non-limiting, representation of a web page 400 that can be rendered in accordance with one or more embodiments described herein.

As illustrated, various functionalities can be provided including, but not limited to: endpoints, billing, automation, and reports. The illustrated web page 400 represents a report related to the endpoints (e.g., the connected assets). As indicated at 404, there can be a large number of endpoints (e.g., over 99 pages of data).

In this example representation of the web page 400, a chart of the total inventory by status 406 can be provided. The inventory can include all the connected assets for an identified entity. Further, the statuses can include, but are not limited to: active, test ready, moved to inventory, activation ready, inactive, and so on. Near each status can be a quantity of assets associated with that status. Thus, in this example there are 780,012 devices active; 540,043 devices activation ready; and 120,432 devices inactive. Accordingly, the number of devices that can be managed in a single view can be a large number of devices that could not be successfully managed manually.

Further, the inventory (e.g., the assets) can be grouped by carrier, at 408. Thus, a percentage of devices per carrier can be immediately visualized. In addition, at 410, data for each asset can be viewed. The data can include, but is not limited to, an identifier of the device, an operator servicing the device, a network type, a country, and data related to the device (e.g., roaming restricted). However, it is noted that this is merely an example and other data can be provided and/or other formats of presenting the data can be utilized with the disclosed aspects.

Figure 5:
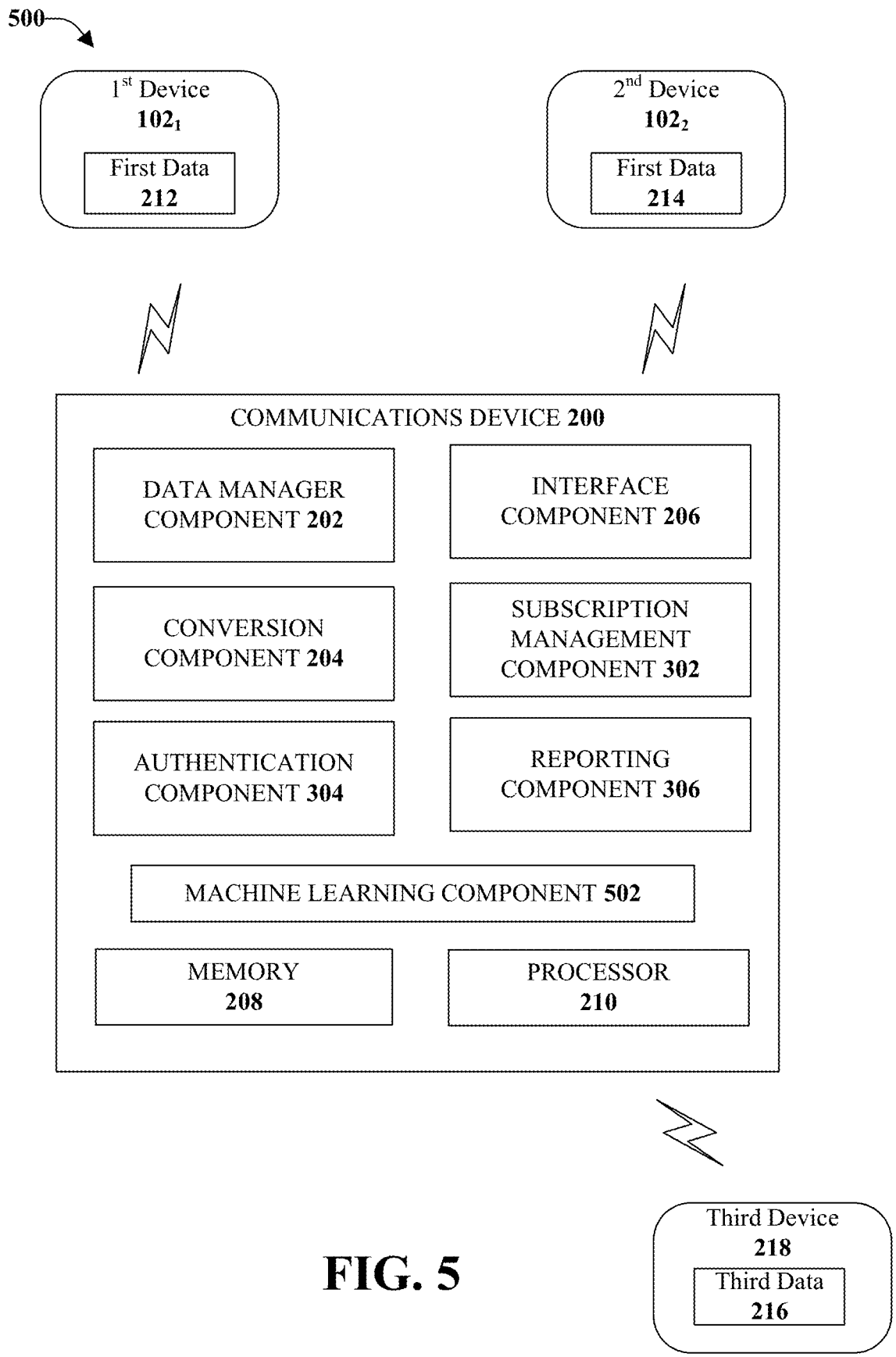
FIG. 5 illustrates an example, non-limiting, system that employs machine learning to automate integrated management of connected assets in accordance with one or more embodiments described herein.

FIG. 5 illustrates an example, non-limiting, system 500 that employs machine learning to automate integrated management of connected assets in accordance with one or more embodiments described herein. Repetitive description of like elements employed in other embodiments described herein is omitted for sake of brevity. The system 500 can comprise one or more of the components and/or functionality of communications system 201, and/or communications system 300, and vice versa.

The system 500 can include a machine learning and reasoning component 502, which can be utilized to automate one or more of the disclosed aspects. The machine learning and reasoning component 502 can employ automated learning and reasoning procedures (e.g., the use of explicitly and/or implicitly trained statistical classifiers) in connection with performing inference and/or probabilistic determinations and/or statistically-based determinations in accordance with one or more aspects described herein.

For example, the machine learning and reasoning component 502 can employ principles of probabilistic and decision theoretic inference. Additionally or alternatively, the machine learning and reasoning component 502 can rely on predictive models constructed using machine learning and/or automated learning procedures. Logic-centric inference can also be employed separately or in conjunction with probabilistic methods.

The machine learning and reasoning component 502 can infer, for one or more connected assets of interest, one or more parameters of interest, and/or one or more revision histories of interest. Based on this knowledge, the machine learning and reasoning component 502 can make an inference based on a simplification of one or more sets of data and/or elimination of one or more subsets of data.

As used herein, the term "inference" refers generally to the process of reasoning about or inferring states of the system, a component, a module, the environment, and/or models from a set of observations as captured through events, reports, data, and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects, for example, in connection with integrated management of connected assets based on knowledge derived from one or more different computing platforms can employ various artificial intelligence-based schemes for carrying out various aspects thereof. For example, a process for determining if a computing platform is compatible with another computing platform in terms of data generated in order to create an integrated view can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistically-based analysis (e.g., factoring into the analysis utilities and costs) to prognose or infer an action that should be employed to determine how an asset is connected to other assets, a status of an asset, a conversion of respective data associated with the assets, and so on. In the case of an integrated view, for example, attributes can be identification of one or more parameters of interest, and the classes can be consolidation of different types of the one or more parameters of interest into a common view for those one or more parameters of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording asset behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining according to a predetermined criteria relations between parameters of interest across a family of connected assets, a determination of a simplification of the parameters of interest, and so forth. The criteria can include, but is not limited to, similar parameters of interest, related information, and so forth.

Additionally or alternatively, an implementation scheme (e.g., a rule, a policy, and so on) can be applied to control and/or regulate asset management simplification and resulting actions, inclusion of one or more parameters, exclusion of one or more parameters, and so forth. In some implementations, based upon a predefined criterion, the rules-based implementation can automatically and/or dynamically interpret types of relations among similar parameters of interest. In response thereto, the rule-based implementation can automatically interpret and carry out functions associated with creating a common, integrated view of the parameters of interest by employing a predefined and/or programmed rule(s) based upon any desired criteria.

As discussed herein, the various aspects can provide various entities, including business customers, the ability to manage assets across multiple networks, carriers, and across the globe through one or more applications/services. For example, the various aspects can be an identify manager (IDM)/user access manager (UAM) solution (e.g., IDM/UAM solution) that can be utilized for access management, session management, and/or authentication of federated entities (e.g., formed as a single centralized unit), such as through a reverse proxy model. Reverse proxy is a type of proxy server that retrieves resources on behalf of a client from one or more servers and the resources are returned to the client as if the resources originated from the web server. In a non-limiting example, this can be facilitated with an OpenID Connect user identity layer, where OpenID Connect is an authentication layer on top of an authorization framework (e.g., OAuth 2.0 protocol.)

Various digital certificates, including secure sockets layer certificates can be utilized. For example, X.509 certificates can be used to verify authenticity of the public keys belonging to the federated systems. According to some implementations, certificates can be managed by a common issuer. In some implementations, if the certificates are tied to a domain name, the certificate can be a wildcard type of certificate that can include the fully qualified domain name (FQDN) and all sub domains that could be generated dynamically. According to the disclosed aspects, an application stack can generate sub domains and mapping for entities that are not included in a default application flow. Additionally or alternatively, entities can utilize a FQDN of their own to map to the sub domain and, therefore, certificate keys can be shared with the entity.

Since the disclosed aspects can be deployed across the world (e.g., globally deployable, to prevent or mitigate latency, cloud solutions can be deployed via replication. Accordingly, information can be shared in order to provide consistency between redundant resources.

Further, development-operations (DevOps) automation can be built into the ecosystem. DevOps is a software delivery process that emphasizes communication and collaboration across the end-to-end system. In an example, changes, customizations, and/or new features can be pushed to the devices as needed (e.g., daily, weekly, and so on). Further, automated code versioning, unit testing, validation, and deployment with testing in production can be provided for efficiency.

A micro-services approach to service-oriented architectures (SOA) can provide additional flexibility by decoupling services on a granular level and, therefore, only minimal object(s) are affected by the changes. Thus, the complete platform does not need to be pushed to production when changes are needed. Further, this can allow the platform to be continuously evolved with new features without causing delays of releases and/or disturbance of the existing product.

For customization, a "white-label" solution can be provided. Accordingly, a custom Uniform Resource Locator (URL) can be provided. Upon or after loading, the customer URL can display the desired appearance and experience as customized by the entity.

In an additional implementation, language support can be automated. In an example, platform release is not necessary to add additional languages. Therefore, if a language is added for an entity, the language can be available across all entities. For example, language selection can be performed via a User Agent (UA) string look-up, where the user's (e.g., the entity's) system language can load automatically. Additionally or alternatively, the language can be manually selected via a "language drop-down" menu. In some implementations, language other than a default language (e.g., U.S. English) can be appended to the URL.

In an example, the user interface can be built starting with the smallest form factor display (e.g., mobile phone) and can scale up gracefully enriching the experience both visually and content-wise. Thus, depending on the deployment, relevant functionality can be offered on smaller form-factors (adaptive content approach). In some implementations, there is no custom URL for the mobile version, the screen (views) are rendered programmatically, and thus, the URL can always be the same. In this way, if a first user shares the screen URL they are perceiving on a phone, for example in German language, a second user that is on a desktop Personal Computer (PC) can perceive the same screen as a desktop version in their native language (English for example).

Further, a portal can be generated to display content arriving from different MNO's linked with the user's account. Thus, one or more MNOs can provide their respective services and those services of the partner MNOs.

Figure 6:
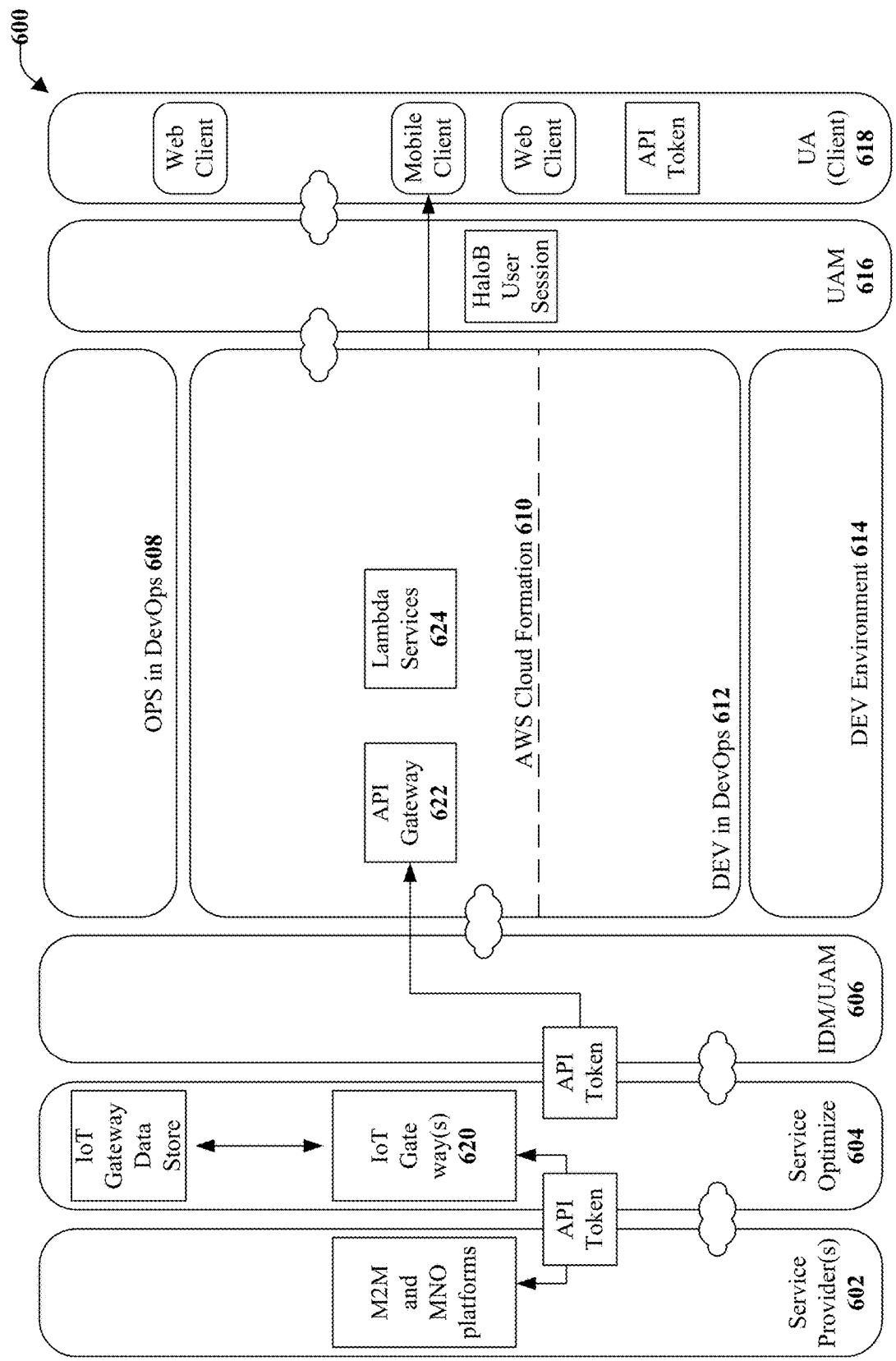
FIG. 6 illustrates an example, non-limiting schematic representation of a simplified version of a cloud platform with a core services technology stack in accordance with one or more embodiments described herein.

FIG. 6 illustrates an example, non-limiting schematic representation 600 of a simplified version of a cloud platform with a core services technology stack in accordance with one or more embodiments described herein.

Illustrated are various sections, which can include a service providers section 602, which can include native data. A service optimization section 604 can include a verbose northbound Application Program Interface (API) connected to a Nth service provider, where N is an integer. It is noted that the platform of the systems discussed herein can integrate APIs in the underlying platforms. Accordingly, an entity's business application only needs to integrate with one set of APIs. This is in contrast to the entity's application needing to integrate with each platform without use of the disclosed aspects.

The service optimization section 604 can also include normalized services. An IDM/UAM section 606, which can include authentication authority, SSO federation, user profile management, and reverse proxy. An OPS in DevOps section 608 can include alarms, performance indicators (e.g., key performance indicators or KPIs), triggers, notifications, and/or analytics. An AWS Cloud Formation section 610 can perform load balancing, automated elastic scaling, web services, and/or elastic storage. A Dev in DevOps 612 section can provide continuous (or another frequency of) integration, delivery, and/or deployment. A Development Environment section 614, UAM Halo.B section 616, and a UA (Client) section 618 can also be included.

As discussed herein, entities can be serviced globally with co-located services. A white-label solution in multi-tenant capacity can include DevOps features of continuous (nearly continuous or non-continuous) delivery and deployment. The various aspects can be deployed to AWS ready in order to be replicated into areas where services are utilized.

According to some implementations, the user of Halo.B (IDM solution) and IoT Gateway can be utilized as the service layer.

As discussed above, an IDM/UAM solution can be used for user access management, session management, and/or authentication of federated entities via reverse proxy model with OpenId Connect user identity layer over the top.

An IoT Gateway 620 can include a service orchestration and normalization layer. The IoT Gateway 620 can perform various functions related to accessing service platforms for relevant data. The IoT Gateway 620 can also normalize the data and create a verbose northbound RESTful API to serve client applications, including the aspects discussed herein.

An API Gateway 622 can be a fully managed service that can be utilized to create a gateway into AWS Lambda (microservices), as an example. The API Gateway 622 can provide a secure, auto scaled entryway into the business logic managed by Lambda. The API Gateway 622 can perform the tasks related to accepting and processing up to hundreds of thousands of concurrent API calls. The API calls can include, but are not limited to traffic management, authorization and access control, monitoring, and/or API version management.

Portal lambda services 624 (as one example) can execute code without the need to provision and/or manage services. Further, lambda services 624 can run code, which can be written in various languages (e.g., Node.js (JavaScript), Python, and Java). According to an implementation, Lambda can scale by running code in response to one or more triggers. Code can run in parallel and triggers of the one or more triggers can be processed individually, scaling with the size of the workload.

Core services can be implemented using, for example, Nodejs and the Serverless framework. The Serverless framework can operate as an organizational and development tool for AWS Lambda. Each Lambda function can represent a microservice endpoint that could be containerized for non-AWS environments.

As it relates to a ReactJS/Redux front-end portal application, the client program can be a web application developed using React and Redux which can run in a browser. This code can bundled and served as static files behind an HTTP and reverse proxy server.

According to some implementations, a monitoring service for AWS cloud resources and the applications running (or executing) on AWS can be provided. The monitoring service can provide operational intelligence solutions including collecting and tracking metrics, collecting and monitoring log files and setting alarms. This can provide system-wide visibility into resource utilization, application performance, and operational health.

A notification service can provide the ability to push notifications as individual messages and/or broadcast messages to a large number of recipients. Further, a queuing service can send, store, and/or receive messages between components at any volume, without losing messages and/or requiring other services to always be available.

Further, object storage can be utilized as intermediary storage. In addition, a relational database service can mange setting up, operating, and/or scaling relational databases. For example, scheduled snapshots of the databases can be taken and stored securely. In some implementations, a database can be utilized to store session relevant data. The data can be purged at the end of a user session, however, the disclosed aspects are not limited to this implementation. Encryption of session data may be utilized in some implementations.

It is noted that in some implementations, AWS architecture is not utilized. Instead, native functionality of the host cloud can be utilized. In some implementations, Halo-b can be utilized to handle attacks and provide the ability to lock a user's account in a configurable manner. For example, a user's account can be locked after x unsuccessful login attempts. Further, there could be no mechanism to register accounts in a publicly accessible manner.

Figure 7:
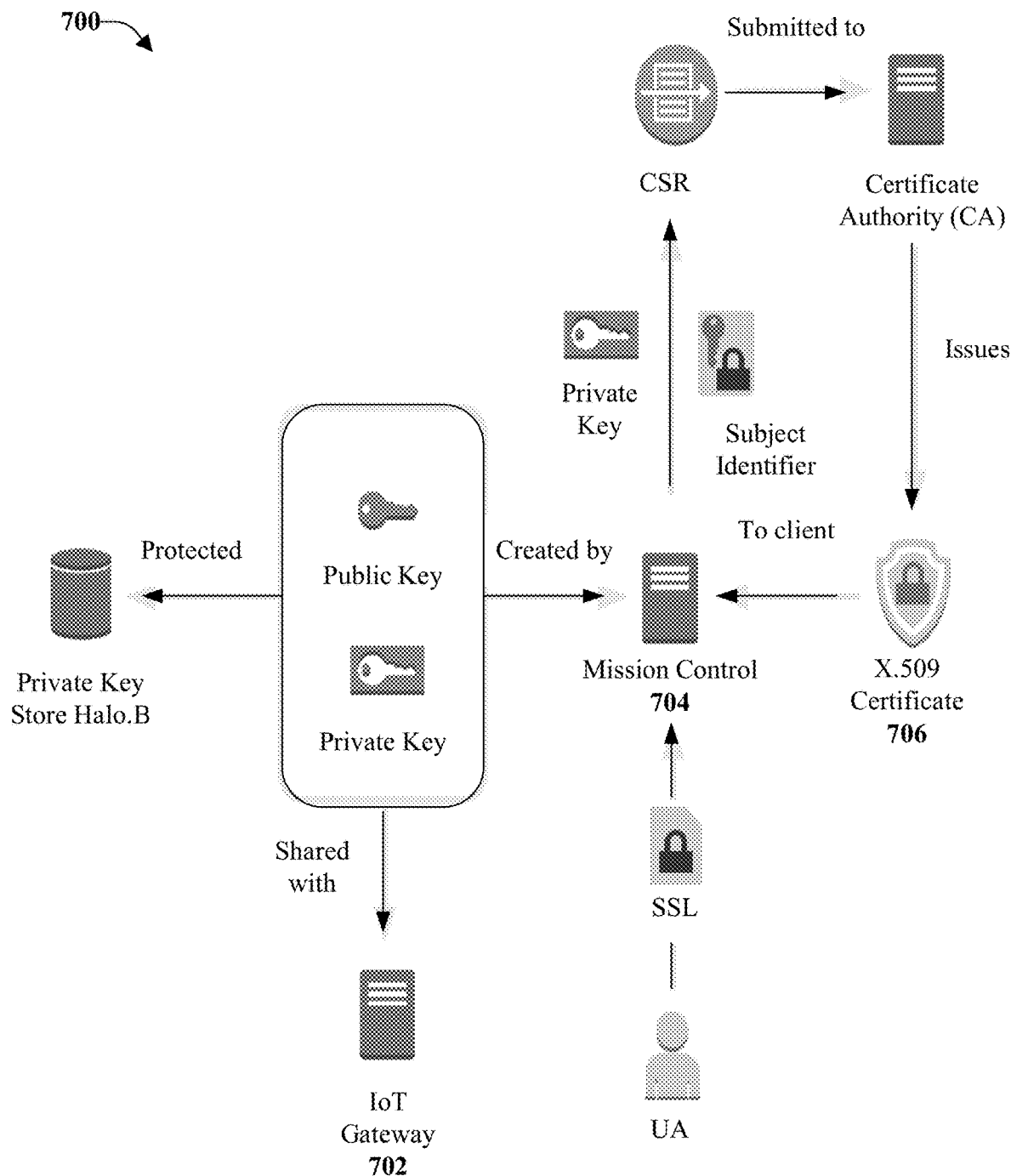
FIG. 7 illustrates an example, non-limiting, schematic representation of application program interface security in accordance with one or more embodiments described herein.

FIG. 7 illustrates an example, non-limiting, schematic representation 700 of API security in accordance with one or more embodiments described herein. In some implementations, the disclosed aspects can implement RESTful requests (GET and POST) to an IoT Gateway 702. The IoT Gateway 702 can gather the data requested and respond to Mission Control 704 (e.g., the disclosed aspects). Mission Control 704 can process the data and display it in a portal.

Security between a Mission Control API Gateway and the IoT Gateway 702 can share x.509 type of certificate(s) 706 issued by a signing authority. The IoT Gateway 702 might only accept communication from a predefined IP address (or range) identified as the Mission Control API Gateway.

Figure 8:
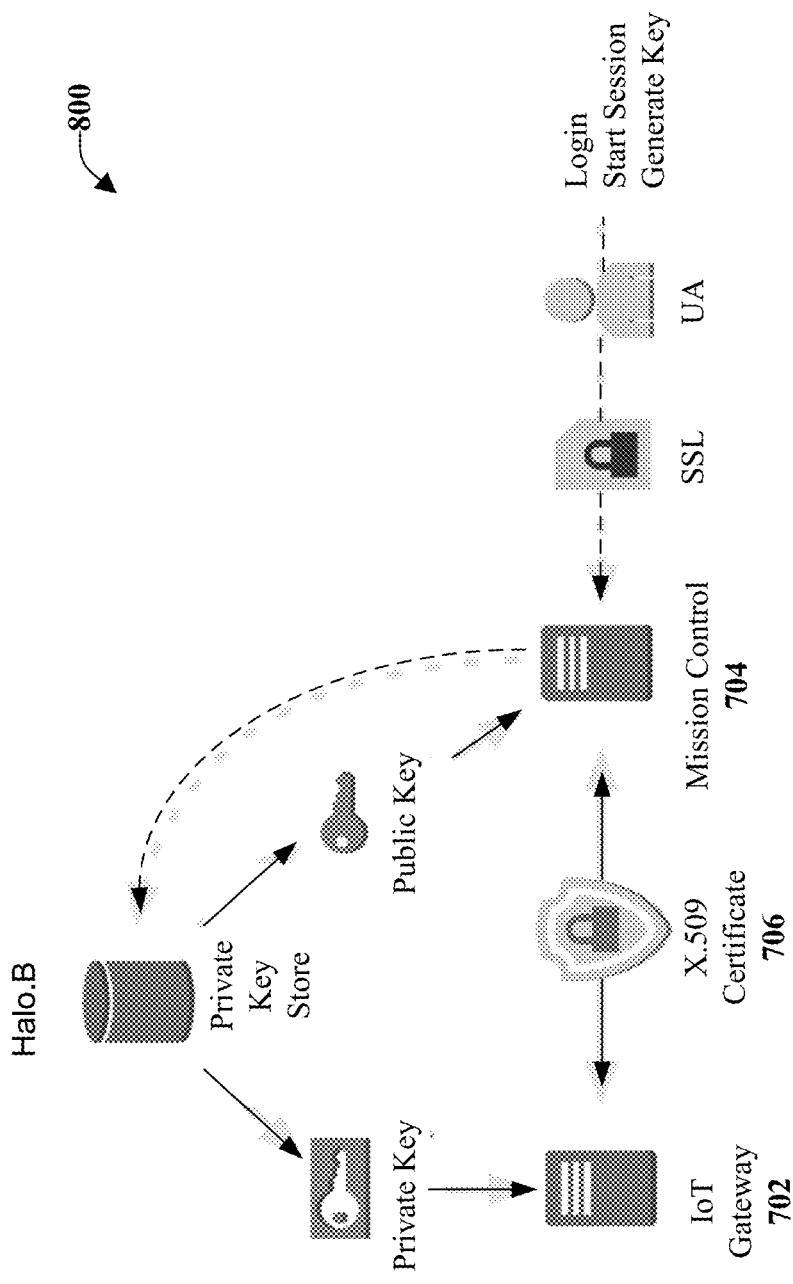
FIG. 8 illustrates an example, non-limiting, schematic representation of key exchange during a request and/or a response in accordance with one or more embodiments described herein.

FIG. 8 illustrates an example, non-limiting, schematic representation 800 of key exchange during a request and/or a response in accordance with one or more embodiments described herein. According to some implementations, data in transit can be encrypted using an AES128 bit encryption (at a minimum).

For database encryption, RDS can provide encryption of instances and snapshots at rest. Data that is encrypted at rest can include the underlying storage for a DB instance, its automated backups, Read Replicas, and snapshots. In some implementations, encrypted instances can use the industry standard AES-256 encryption algorithm to encrypt data on the server that hosts the database instance. Once data is encrypted, authentication of access and decryption of data can be performed transparently with a minimal impact on performance.

In addition to encrypting data in transit with AES 128-Bit encryption, and securing it via x.509, the web portal can also have a certificate of authenticity, binding a domain name, server name or hostname, an organizational identity (e.g., company name) and location.

In some implementations, an IDM/UAM solution can be used for user access management, password management, encryption, password retrieval, account linking, rules and policies enforcement, session creation, session management, and authentication of federated entities via reverse proxy model with OpenID Connect user identity layer over the top. The user data can be stored on Halo.b side (profile data store). Mission control can communicate with Halo.b via header-based authentication and reverse proxy model, with authentication over the top (OpenID Connect).

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram. According to some implementations, a machine-readable storage medium, comprising executable instructions that, when executed by a processor, facilitate performance of the methods. According to other implementations, a non-transitory computer-readable medium, comprising executable instructions that, when executed by a processor, facilitate performance of the methods.

Figure 9:
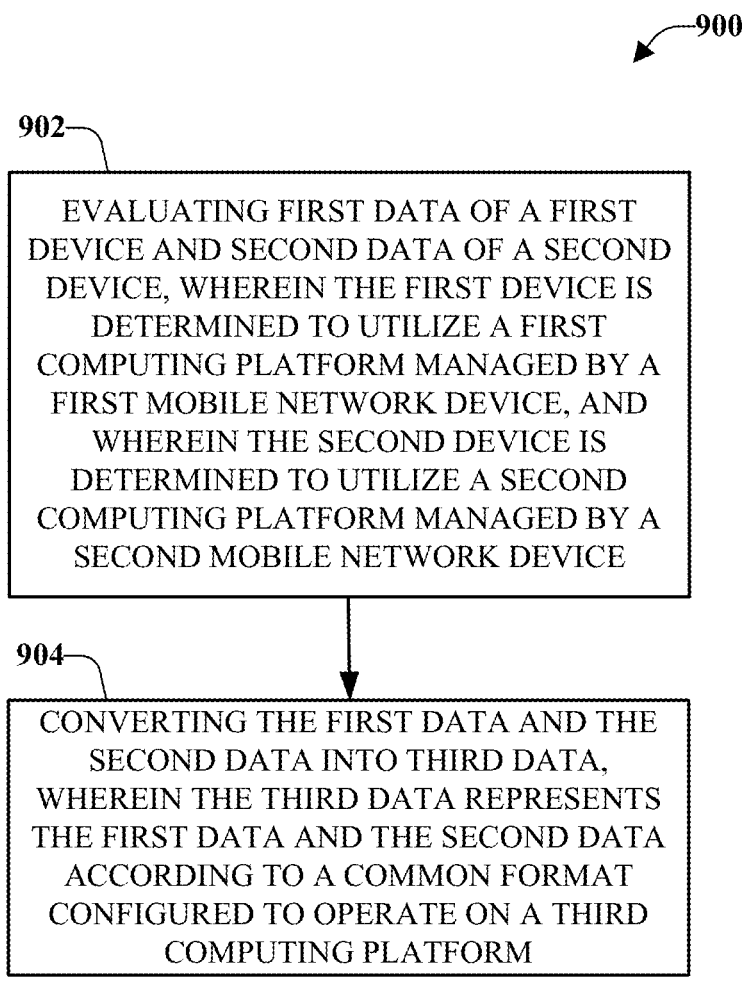
FIG. 9 illustrates an example, non-limiting, method for facilitating integrated management of connected assets in accordance with one or more embodiments described herein.

FIG. 9 illustrates an example, non-limiting, method 900 for facilitating integrated management of connected assets in accordance with one or more embodiments described herein. The method 900 can be implemented by a network device of a wireless network, the network device comprising a processor. Alternatively or additionally, a machine-readable storage medium can comprise executable instruction that, when executed by a processor, facilitate performance of operations for the method 900.

The method 900 starts at 902 when first data of a first device and second data of a second device is evaluated. The first device can be determined to utilize a first computing platform managed by a first mobile network device. Further, the second device can be determined to utilize a second computing platform managed by a second mobile network device.

According to an implementation, the method 900 can include determining the first computing platform is managed by a first mobile network operator of a first geographic region that applies first localized standards to manage the first device. Further, the method 900 can include determining the second computing platform is managed by a second mobile network operator of a second geographic region that applies second localized standards to manage the second device.

According to an implementation, the first data can comprise first subscriber identification module historical information for the first device. Further, the second data can comprises second subscriber identification module historical information for the second device.

The first data and the second data can be converted into third data, at 904. The third data can represent the first data and the second data according to a common format configured to operate on a third computing platform. Converting the data can include determining the first device comprises a subscriber identification module that was re-credentialed for use with the first computing platform, and wherein the third data comprises historical data for the subscriber identification module.

In another example, converting the data can include parsing at least the first portion of the first data based on a first native format of the first data and parsing at least the second portion of the second data based on a second native format of the second data.

As used herein, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 10:
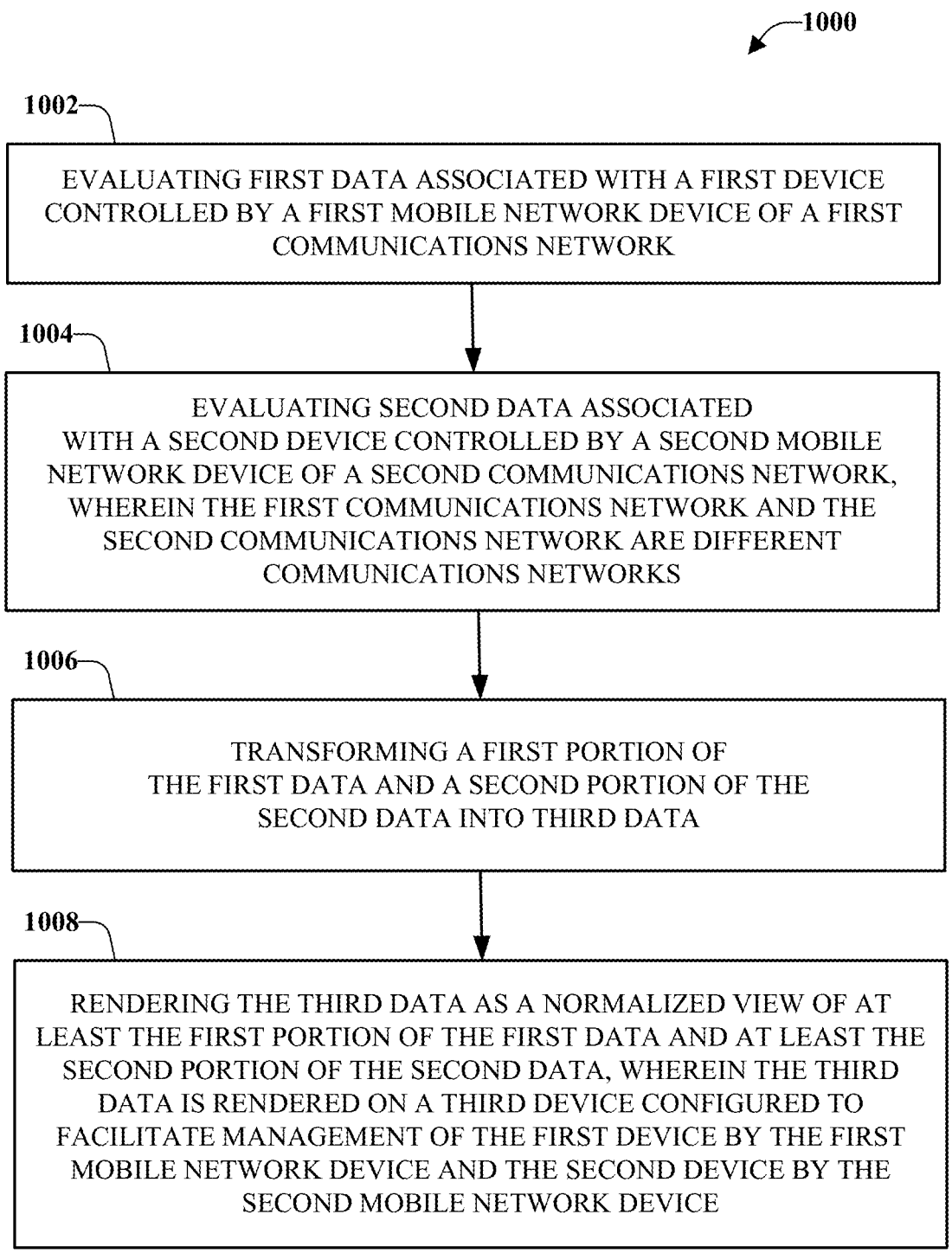
FIG. 10 illustrates an example, non-limiting, method for facilitating creation of an integrated view for management of connected assets in accordance with one or more embodiments described herein.

FIG. 10 illustrates an example, non-limiting, method 1000 for facilitating creation of an integrated view for management of connected assets in accordance with one or more embodiments described herein. The method 1000 can be implemented by a network device of a wireless network, the network device comprising a processor. Alternatively or additionally, a machine-readable storage medium can comprise executable instruction that, when executed by a processor, facilitate performance of operations for the method 1000.

At 1002, first data associated with a first device controlled by a first mobile network device of a first communications network is evaluated. Further, second data associated with a second device controlled by a second mobile network device of a second communications network is evaluated, at 1004. The first communications network and the second communications network can be different communications networks. The first device and the second device can be internet of things devices.

A first portion of the first data and a second portion of the second data can be transformed into third data, at 1006. The third data can be rendered, at 1008, as a normalized view of at least the first portion of the first data and at least the second portion of the second data. The third data can be rendered on a third device configured to facilitate management of the first device by the first mobile network device and the second device by the second mobile network device.

According to an implementation, the first data can comprise first subscriber identification module historical provision information for the first device. Further, the second data can comprise second subscriber identification module historical provision information for the second device.

Figure 11:
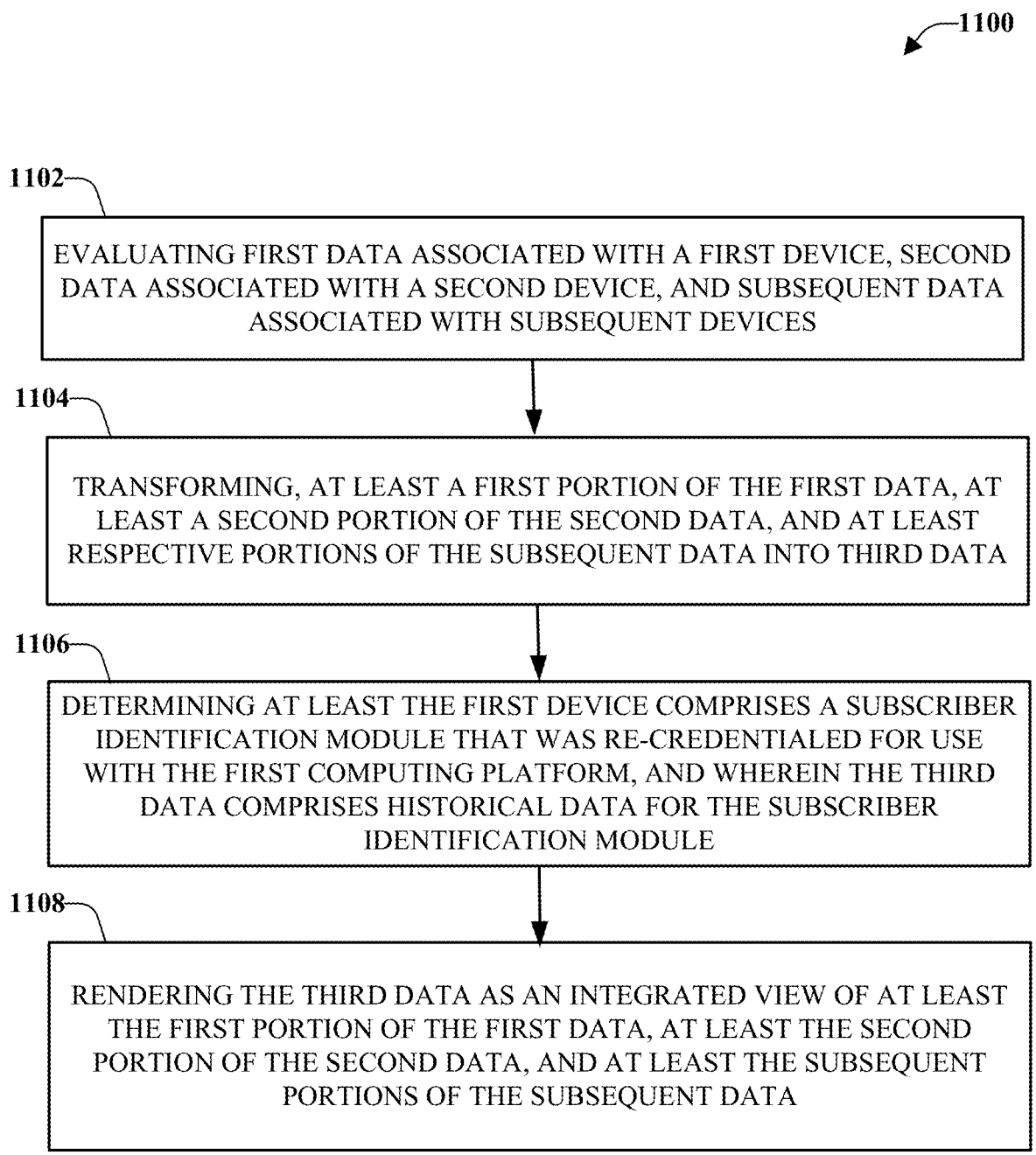
FIG. 11 illustrates an example, non-limiting, method for facilitating subscriber mobile identity management of one or more connected assets in accordance with one or more embodiments described herein.

FIG. 11 illustrates an example, non-limiting, method 1100 for facilitating subscriber mobile identity management of one or more connected assets in accordance with one or more embodiments described herein. The method 1100 can be implemented by a network device of a wireless network, the network device comprising a processor. Alternatively or additionally, a machine-readable storage medium can comprise executable instruction that, when executed by a processor, facilitate performance of operations for the method 1100.

At 1102, first data associated with a first device, second data associated with a second device, and subsequent data associated with subsequent devices are evaluated. The first device, second device, and subsequent devices can be operable with different computing platforms. For example, the first device can be operable with a first computing platform and the second device can be operable with a second computing platform. The first computing platform and the second computing platform can be different computing platforms. Further, the devices of the subsequent devices can be operable with the first computing platform, the second computing platform, or one or more other computing platforms.

At 1104, at least a first portion of the first data, at least a second portion of the second data, and at least respective portions of the subsequent data can be transformed into third data. The third data can be compatible with the first data, the second data, and the subsequent data. According to an implementation, transforming the data can include, at 1106, determining at least the first device comprises a subscriber identification module that was re-credentialed for use with the first computing platform. The third data can comprise historical data for the subscriber identification module. According to some implementations, the determination at 1106 can be that one or more of the second device and/or the subsequent devices comprise respective subscriber identification modules that were modified (e.g., re-credentialed). This information can also be included in the third data.

At 1108, the third data can be rendered as an integrated view of at least the first portion of the first data and at least the second portion of the second data. The third data can be rendered on a third device remote from the first device and the second device.

As discussed herein, various entities, when attempting to manage their connected assets, have to interact with multiple connecting networks in their IoT systems in order to obtain ubiquitous coverage and to address different use cases. For entities with an international presence, their products or assets can be distributed in many countries and regions, using services from local mobile network operators (MNOs). These entities are forced to deal with different networks and manage several accounts. The data among these different networks is not synchronized or consolidated. As a result, time consuming effort has to be expended for system monitoring, configuration, diagnostic, and reporting (if it can be performed at all).

Various machine-to-machine (M2M) solutions are provided herein for IoT services. In some markets, partnering with local operators can be conducted in order to deliver services and, therefore, subject to the M2M management systems of the local operator.

The various aspects provide a single view of a management system that integrates multiple networks and technologies. Such integration can be performed dynamically and various modifications and/or reporting can be performed in real-time. As discussed herein, advanced multi-network technology solutions can be leveraged. Further, flexible and scalable platforms and solutions designed for IoT can be built with the aspects discussed herein. Also, the various aspects provide a strategic global expansion to other countries. Further, integrated network management platforms can be provided, as well as a portfolio of services.

The disclosed aspects can provide IoT solutions and services to international entities (e.g., customers) with multiple IoT business cases. Further, there can be a decreased lead time for partners (e.g., other network operators) that would like access to multiple systems in order to troubleshoot issues and/or manage devices. Further, reduced operation and training costs can be provided since the integrated view can be customized depending on the entity consuming the information. The various entities can be international customers with businesses in multiple regions, domestic customers needing ubiquitous coverage for their IoT device, and/or customers needing a combination of technologies to address their multiple business cases.

In an example, an entity can be a manufacturer of vehicles, which utilize SIM lifecycle management performed in two separate systems depending on whether the vehicle is active with a retail data plan or not. Thus, the various aspects can receive/send information to these systems. Thus, the vehicles can be managed seamlessly regardless of the state (e.g. trial, no trial, retail) with one system and one login.

In another vehicle example, the vehicles can be deployed across the globe spanning over one hundred countries, utilizing various systems. The disclosed aspects allow for the management of the vehicles with one system, without the need to access each carrier and country's unique M2M platform. Further, the day-to-day operations can be simplified with the disclosed aspects.

In yet another example, an entity can manage refrigerators in large retail chains. The refrigerators can be connected to monitor the temperature and location. The connected refrigerators can be in multiple countries. The SIMs need to be automatically profiled and connected to the local MNO network. The disclosed aspects can simplify the initial deployment and can reduce overall deployment time.

In some implementations, the entities can work with various operators for the devices in different locations or regions. Further, the devices can operate with cellular, satellite, or Wi-Fi to achieve ubiquitous and cost effective coverage. Training and constant monitoring is necessary for these multiple devices, countries, and multiple network management platforms. With the disclosed aspects, the entity only needs to manage one system to control their IoT device's lifecycle.

According to some aspects, a web portal can be provided. The web portal can have an intuitive design that offers enterprise customers real-time management for monitoring and management of all of their IoT devices. Further, authentication can be provided to the portal through a single access credential. In addition, the ability to setup sub credentials with limited access control can be provided. For example, limited access control can relate to reporting, invoice payment, and so on.

In an implementation, core functionalities such as: SIM ordering, SIM profile updates, Device Monitoring, Device Lifecycle Management, Automation via Rule Configuration, Diagnostic, Reporting, Billing, and Subscription Management can be provided. Further, a service enabling platform that can manage data collected from connected devices and provide a core set of reporting capabilities, through the web portal can be provided.

The various aspects provide synthesize data from cellular networks and satellite networks to offer holistic system management, devices provisioning, reporting, diagnostics, and so on. In addition, APIs can be provided to other management systems, such as Business Center and customer's business applications. Adapters (APIs) can be provided to integrate other MNO "Control Center" platforms into the various aspects discussed herein. This can allow enterprise customers to manage their assets and devices connected through their networks.

The ability to aggregate data from different MNOs into one report is provided. Also provided herein can be carrier grade security capabilities. Further, provided can be a scalable and flexible platform to adapt to customer's business need and growth objectives. The various aspects can also provide an Interface that enables SIM orders for small businesses, presentation of invoices including invoice history, and potential payment processing, device management, and subscription management as a service.

Described herein are systems, methods, articles of manufacture, and other embodiments or implementations that can facilitate integrated management of connected assets in a communications network. Facilitating integrated management of connected assets can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 12:
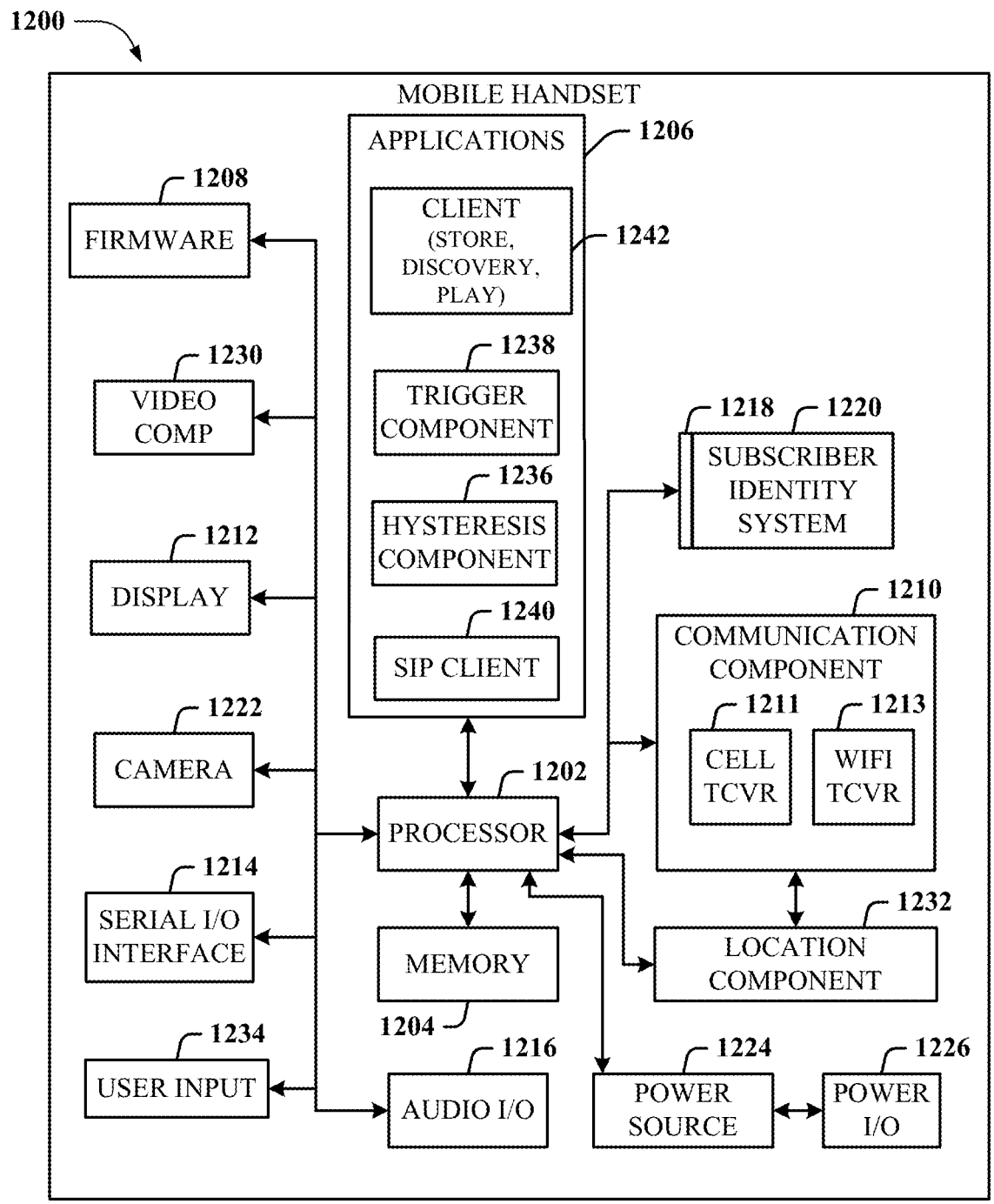
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VOIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
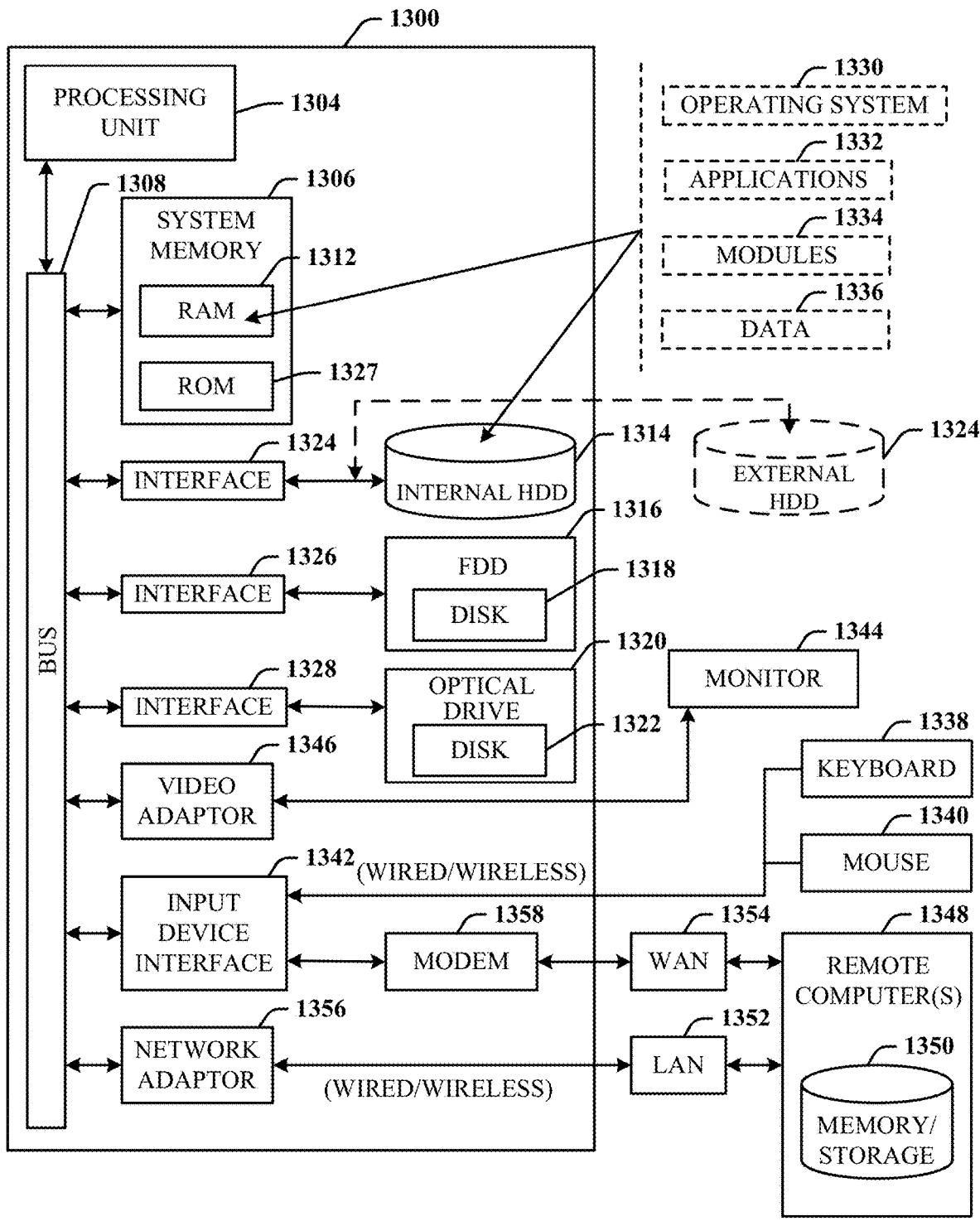
FIG. 13 illustrates an example block diagram of an example computer operable to engage in a system architecture that facilitates wireless communications according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1300 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   evaluating, by a system comprising a processor, first data associated with a first device operable with a first computing platform and second data associated with a second device operable with a second computing platform different from the first computing platform;
   determining, by the system, a first native format of a first portion of the first data based on a first identification of a first network service provider device operatively coupled to the first device, and a second native format of a second portion of the second data based on a second identification of a second network service provider device operatively coupled to the second device;
   transforming, by the system, the first portion of the first data and the second portion of the second data into third data, the transforming comprises parsing the first portion of the first data based on the first native format and the second portion of the second data based on the second native format, wherein the first network service provider device and the second network service provider device are located in different geographic regions, and wherein the third data is compatible with the first data and the second data; and
   rendering, by the system, the third data as an integrated view of the first portion of the first data and the second portion of the second data, wherein the third data is to be rendered on a third device remote from the first device and the second device.

2. The method of claim 1, wherein the transforming the first portion of the first data and the second portion of the second data comprises:
   determining the first computing platform is managed by a first mobile network operator of a first geographic region that applies first localized standards to manage the first device; and
   determining the second computing platform is managed by a second mobile network operator of a second geographic region that applies second localized standards to manage the second device.

3. The method of claim 1, wherein the transforming the first portion of the first data and the second portion of the second data comprises determining the first device comprises a subscriber identification module that was re-credentialed for use with the first computing platform, and wherein the third data comprises historical data for the subscriber identification module.

4. The method of claim 1, wherein the first computing platform utilizes satellite technology, and wherein the second computing platform utilizes Wi-Fi technology.

5. The method of claim 1, wherein the third data is a normalized version of the first data and the second data.

6. The method of claim 1, further comprising:
   determining, by the system, that the first device and the second device comprise a similar functionality according to a similarity criterion.

7. The method of claim 1, further comprising:
   determining, by the system, that the first device and the second device comprise different functionalities according to a dissimilarity criterion.

8. The method of claim 1, wherein the third data is operable in accordance with the first computing platform.

9. The method of claim 1, wherein the third data is operable in accordance with the second computing platform.

10. A system, comprising:

a processor; and a memory that stores executable instructions that, when executed by the processor, facilitate performance of operations, comprising:

evaluating first data of a first device and second data of a second device, wherein the first device is determined to utilize a first computing platform managed by a first mobile network device, and wherein the second device is determined to utilize a second computing platform managed by a second mobile network device;

determining the first data comprises a first native format associated with a first service provider device, and the second data comprises a second native format associated with a second service provider device;

converting the first data and the second data into third data based, in part, on the first native format and the second native format, wherein the third data represents the first data and the second data according to a common format configured to operate on a third computing platform; and normalizing the first data based on the first native format of the first device; and normalizing the second data based on the second native format of the second device, wherein the first service provider device and the second service provider device are located in separate geographic areas.

11. The system of claim 10, wherein the operations further comprise:

rendering the third data in a configurable format, facilitating a first alteration of a first configuration of the first device based on a first change to the third data; and facilitating a second alteration of a second configuration of the second device based on a second change to the third data.

12. The system of claim 10, wherein the first device and the second device are classified as internet of things devices.

13. The system of claim 10, wherein the first data comprises first subscriber identification module historical information for the first device, and wherein the second data comprises second subscriber identification module historical information for the second device.

14. A non-transitory machine-readable storage medium, comprising executable instructions that, when executed by a processor, facilitate performance of operations, comprising:

evaluating first data associated with a first device controlled by a first mobile network device of a first communications network, wherein the first data comprises a first native format determined based on a first identification of a first network device of the first communications network, wherein the first network device is operatively coupled to the first device;

evaluating second data associated with a second device controlled by a second mobile network device of a second communications network, wherein the second data comprises a second native format determined based on a second identification of a second network device of the second communications network, wherein the second network device is operatively coupled to the second device, and wherein the first communications network and the second communications network are different communications networks;

transforming a first portion of the first data and a second portion of the second data into third data comprising parsing the first portion of the first data based on the first native format and the second portion of the second data based on the second native format, wherein the first network device and the second network device are located in disparate geographic regions; and rendering the third data as a normalized view of at least the first portion of the first data and at least the second portion of the second data, wherein the third data is rendered on a third device configured to facilitate management of the first device by the first mobile network device and the second device by the second mobile network device.

15. The non-transitory machine-readable storage medium of claim 14, wherein the first device and the second device are internet of things devices.

16. The non-transitory machine-readable storage medium of claim 14, wherein the first data comprises first subscriber identification module historical provision information for the first device, and wherein the second data comprises second subscriber identification module historical provision information for the second device.

17. The non-transitory machine-readable storage medium of claim 14, wherein the operations further comprise determining that the first device and the second device comprise a similar functionality according to a similarity criterion.

18. The non-transitory machine-readable storage medium of claim 14, wherein the operations further comprise determining that the first device and the second device comprise different functionalities according to a dissimilarity criterion.

19. The non-transitory machine-readable storage medium of claim 14, wherein the operations further comprise:

facilitating a first alteration of a first configuration of the first device based on a first change to the third data; and facilitating a second alteration of a second configuration of the second device based on a second change to the third data.

20. The non-transitory machine-readable storage medium of claim 14, wherein the first communications network utilizes satellite technology, and wherein the second communications network utilizes Wi-Fi technology.

* * * * *